United States Patent
Lepak et al.

(10) Patent No.: US 8,484,593 B2
(45) Date of Patent: Jul. 9, 2013

(54) METHOD OF DETERMINING EVENT BASED ENERGY WEIGHTS FOR DIGITAL POWER ESTIMATION

(75) Inventors: Kevin M. Lepak, Austin, TX (US); Benjamin E. Floering, San Jose, CA (US); Hrishikesh Murukkathampoondi, Indranagar (IN)

(73) Assignee: Advanced Micro Devices, Sunnyvale, CA (US)

( * ) Notice: Subject to any disclaimer, the term of this patent is extended or adjusted under 35 U.S.C. 154(b) by 334 days.

(21) Appl. No.: 12/838,767

(22) Filed: Jul. 19, 2010

(65) Prior Publication Data
US 2012/0017188 A1    Jan. 19, 2012

(51) Int. Cl.
*G06F 17/50*    (2006.01)
(52) U.S. Cl.
USPC .......................................................... 716/109
(58) Field of Classification Search
USPC .......................................................... 716/109
See application file for complete search history.

(56) References Cited

U.S. PATENT DOCUMENTS

| | | | |
|---|---|---|---|
| 6,564,328 B1 | 5/2003 | Grochowski | |
| 7,096,145 B2 | 8/2006 | Orenstien | |
| 8,060,765 B1 * | 11/2011 | Cha et al. | 713/322 |
| 2010/0268974 A1 * | 10/2010 | Floyd et al. | 713/340 |
| 2011/0301889 A1 * | 12/2011 | Naffziger et al. | 702/62 |

OTHER PUBLICATIONS

Shimpi: "AMD Reveals More Llano Details at ISSCC: 32nm, Power Gating, 4-cores, Turbo?"; AnandTech.com Feb. 8, 2010; http://www.anandtech.com/print/2933.

Stokes: "AMD reveals Fusion CPU+GPU, to challege Intel in laptops"; Arstecnica.com; Feb. 8, 2010; http://arstechnica.com/business/news/2010/02/amd-reveals-fusion-cpugpu-to-challege-intel.

* cited by examiner

*Primary Examiner* — Jack Chiang
*Assistant Examiner* — Brandon Bowers
(74) *Attorney, Agent, or Firm* — Meyertons Hood Kivlin Kowert & Goetzel; Stephen J. Curran

(57) ABSTRACT

A method for determining event based energy weights for digital power estimation includes obtaining a reference energy value corresponding to a power consumed by at least a portion of an integrated circuit (IC) device during operation. The method includes determining and selecting a subset of signals from a set of all signals within the IC that correlates to energy use within the IC. The method includes determining an activity factor of each signal in the subset by monitoring each signal while simulating execution of a particular set of instructions. The method includes determining a weight factor or at least an approximation of a weight factor for each signal in the subset by solving within a predetermined accuracy, a multivariable equation in which the reference energy value equals a weighted sum of the activity of the signals of the selected subset multiplied by their respective weight factors.

22 Claims, 4 Drawing Sheets

METHOD OF DETERMINING EVENT BASED ENERGY WEIGHTS FOR DIGITAL POWER ESTIMATION

BACKGROUND

1. Technical Field

This disclosure relates to power usage estimation and, more particularly, to power usage estimation in a microprocessor using digital techniques.

2. Description of the Related Art

Many modern processors are capable of consuming a great deal of power and in so doing may generate a significant amount of heat. If left unchecked, this heat could cause catastrophic damage to the processor. Thus, power management systems have been developed to limit the power the processor consumes and thus the heat generated. In many power management systems, the thermal design power (TDP) for the whole chip is commonly the primary metric that is used to control power and ensure thermal limits are not exceeded. Typically, if the thermal limits are being reached, or the thermal power reaches a particular threshold, the power management system may throttle the processor by reducing performance. Conversely, if power consumption can be accurately measured while running a given application, and the power used is less than the TDP capability of the platform, performance may be increased by allowing the processor to consume the available headroom in the TDP by increasing the operating voltage, the operating frequency or both. However, the capabilities of conventional thermal measurement mechanisms have less than acceptable granularity and repeatability in many cases. In addition, conventional analog power measurement typically requires complex analog-to-digital converters and associated circuitry.

SUMMARY

Various embodiments of a method for determining event based energy weights for digital power estimation are disclosed. Estimating power on an integrated circuit device using digital techniques may require granularity and precision. Accordingly, power monitors have been developed that monitor a set of signals for specific activity. Each such signal may correlate to a particular amount of the power consumed by the integrated circuit device. This correlation may be referred to as the weight factor of a particular signal. Thus, for the power monitor to be able to accurately estimate the power consumed by the integrated circuit device or any portion thereof, the power monitor uses an appropriate subset of signals to monitor, and the respective weight factor for each signal.

In one embodiment, the method includes obtaining a reference energy value corresponding to a power consumed by at least a portion of an integrated circuit device during operation. The method may also include determining and selecting a subset of signals from a set of all signals within the integrated circuit device that correlate to energy use within the integrated circuit device. The method also includes determining an activity factor of each signal in the selected subset of signals by monitoring each signal while simulating execution of a particular set of instructions, such as a power test program, for example. The method may further include determining a weight factor or at least an approximation of a weight factor for each signal in the selected subset of signals based on the energy value, the activity factors, and the respective weight factors. For example, the weight factors may be found by solving within a predetermined accuracy percentage, a multivariable equation in which the reference energy value equals a weighted sum of the signals of the selected subset of signals multiplied by their respective weight factors.

In one specific implementation, the method includes estimating the power consumed by at least a portion of an integrated circuit device by running a gate level simulation of a register transfer level (RTL) design of the integrated circuit device executing the particular set of instructions.

In another specific implementation, the method includes measuring the power consumed by at least a portion of an integrated circuit device by causing the integrated circuit device to execute the particular set of instructions and directly measuring the power consumed.

Figure 1:
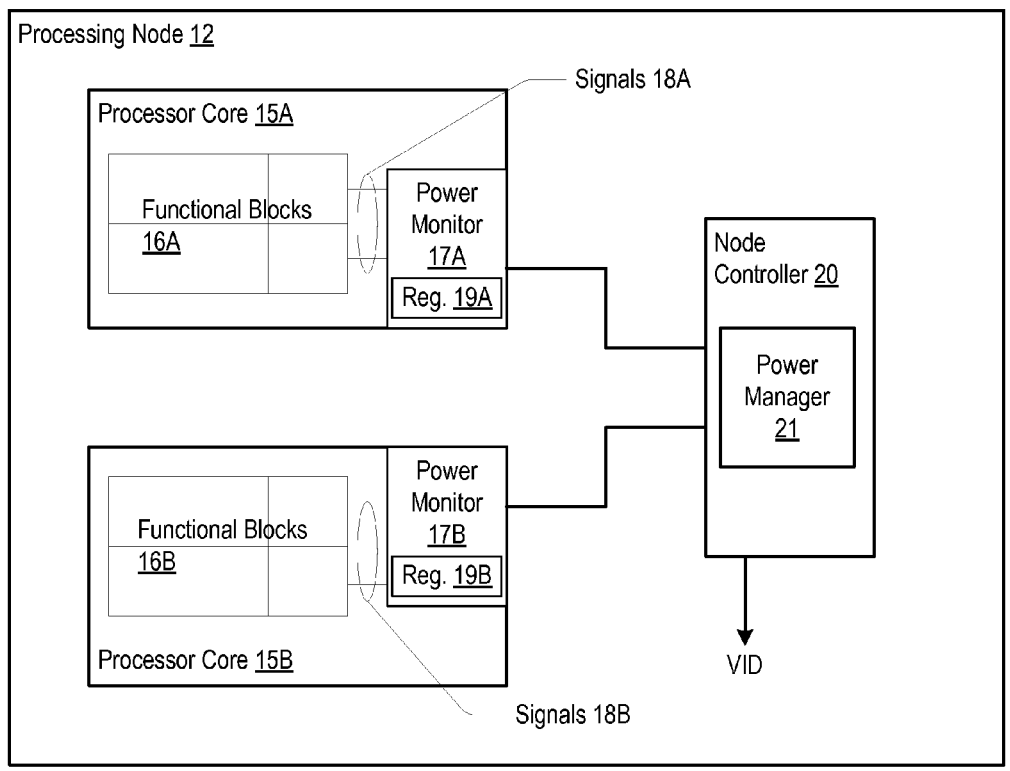
FIG. 1 is a block diagram of one embodiment of a processing node having processor cores with digital power monitors.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

Turning now to FIG. 1, a simplified block diagram of one embodiment of a processing node is shown. In the illustrated embodiment, the processing node 12 includes processor cores 15A-15B coupled to a node controller 20. In one embodiment, node 12 may be a single integrated circuit chip comprising the circuitry shown therein in FIG. 1. That is, node 12 may be a chip multiprocessor (CMP). Other embodiments may implement the node 12 as two or more separate integrated circuits, as desired. Any level of integration or discrete components may be used. It is noted that components having a number and a letter as a reference designator may be referred to by the number only where appropriate.

It is also noted that, a processing node such as node 12 may include any number of processor cores, in various embodiments. It is further noted that processor node 12 may include many other components that have been omitted here for simplicity. For example, in various embodiments processing node 12 may include an integral memory controller and various communication interfaces for communicating with other nodes, and I/O devices.

In one embodiment, node controller 20 may include various interconnection circuits (not shown) for interconnecting processor cores 15A and 15B to each other, to other nodes, and to a system memory (not shown). As shown, the node controller 20 includes a power manager 21 that may be configured to control the amount of power consumed by each processor core 15 and therefore, the amount of heat generated. The power manager 21 may be configured to control the operating frequency for each core and/or the power supply voltages for the node using the voltage identifier (VID) signals provided to the voltage regulator(s). In one embodiment, the maximum and minimum operating frequencies for the node and the maximum and minimum power supply voltages for the node may be provided via fuses that are blown during manufacture. In addition, as described further below, the power manager 21 may be configured to control the power consumed by each core based upon power estimates provided by the power monitors 17A and 17B within each of processor cores 15A and 15B, respectively.

Generally, a processor core (e.g., 15A-15B) may include circuitry that is designed to execute instructions defined in a given instruction set architecture. That is, the processor core circuitry may be configured to fetch, decode, execute, and store results of the instructions defined in the instruction set architecture. For example, in one embodiment, processor cores 15A-15B may implement the x86 architecture. The processor cores 15A-15B may comprise any desired configurations, including superpipelined, superscalar, or combinations thereof. Other configurations may include scalar, pipelined, non-pipelined, etc. Various embodiments may employ out of order speculative execution or in order execution. The processor core may include microcoding for one or more instructions or other functions, in combination with any of the above constructions. Various embodiments may implement a variety of other design features such as caches (e.g., L1 and L2 caches), TLBs, etc. These various design features and microarchitectural blocks described above are represented in FIG. 1 as functional blocks 16A and 16B of processor cores 15A and 15B, respectively.

Figure 3:
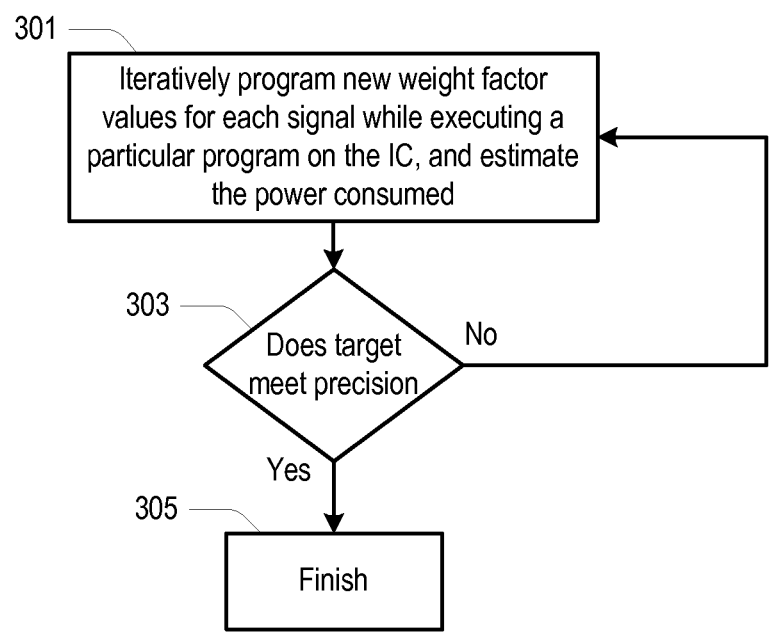
FIG. 3 is a flow diagram depicting another embodiment of a method for determining the weight factors to apply to each signal during power monitoring and estimation.
Figure 4:
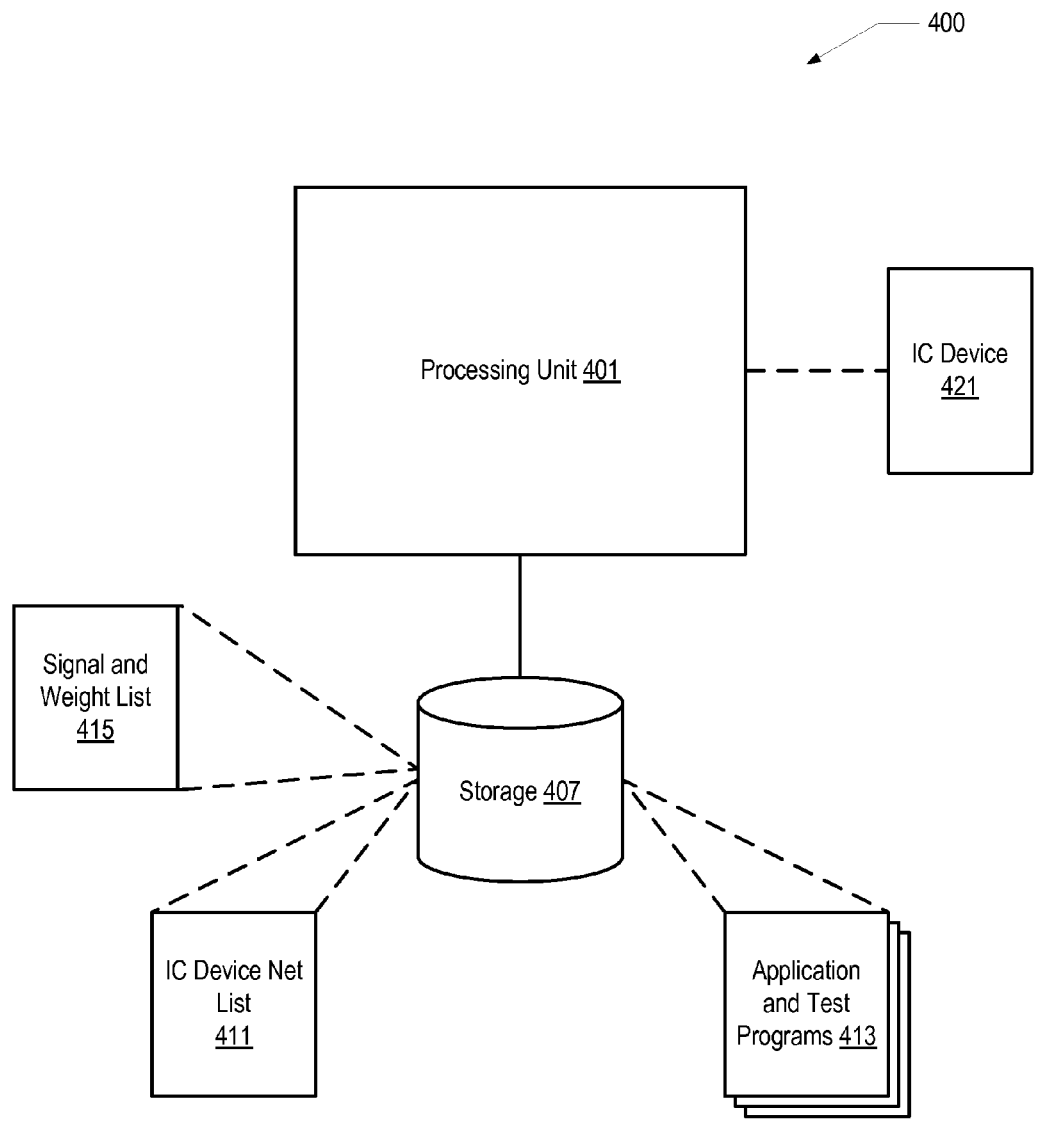
FIG. 4 is a block diagram of one embodiment of a system for use in determining the weight factors to apply to each signal during power monitoring and estimation.

In the illustrated embodiment, processor core 15A includes a power monitor 17A, which includes one or more storages (e.g., reg. 19A), for example. Likewise, processor core 15B includes a power monitor 17B, which also includes one or more storages (e.g., reg. 19B), for example. As described further below, the power monitors 17 may be configured to store signal names and corresponding weight factor values. In various embodiments, the signal names may be programmed into the power monitors either during manufacturing, or using specialized test modes after manufacture. Similarly, for the weight factor values. As will be described in greater detail below in conjunction with the description of FIG. 2 and FIG. 3, in various embodiments, the signals may be selected and their corresponding weight factors may be determined using techniques such as gate level simulation of a register transfer level (RTL) design of the IC, as well as direct monitoring of a representative IC device. An exemplary system for performing the RTL simulation or directly measuring power from the IC is shown in FIG. 4.

In addition, using the signals and weight factors each power monitor 17 may also be configured to estimate the total power consumed, as well as the power consumed by individual portions of a respective processor core 15 within which it is located using digital techniques. More particularly, in one embodiment, each power monitor 17 may be configured to monitor the activity factor or level of each signal that has been programmed into it, and to multiply that activity factor by the weight factor for that signal. The power monitor may, depending on how it is programmed, sum the resulting energy values for each monitored signal to obtain the total energy value for the IC. In another embodiment, each power monitor 17 may calculate the energy value for only specified portions of the IC. The power monitors 17 may then provide energy value(s) that correspond to the consumed power to the power manager 21. In response to the energy values provided by the power monitors 17, the power manager 21 may increase or decrease the frequency of one or more cores, increase or decrease the operating voltages of the cores, or otherwise control the operational state of the cores in an effort to optimize performance while staying within the thermal budget of the processing node 12.

Figure 2:
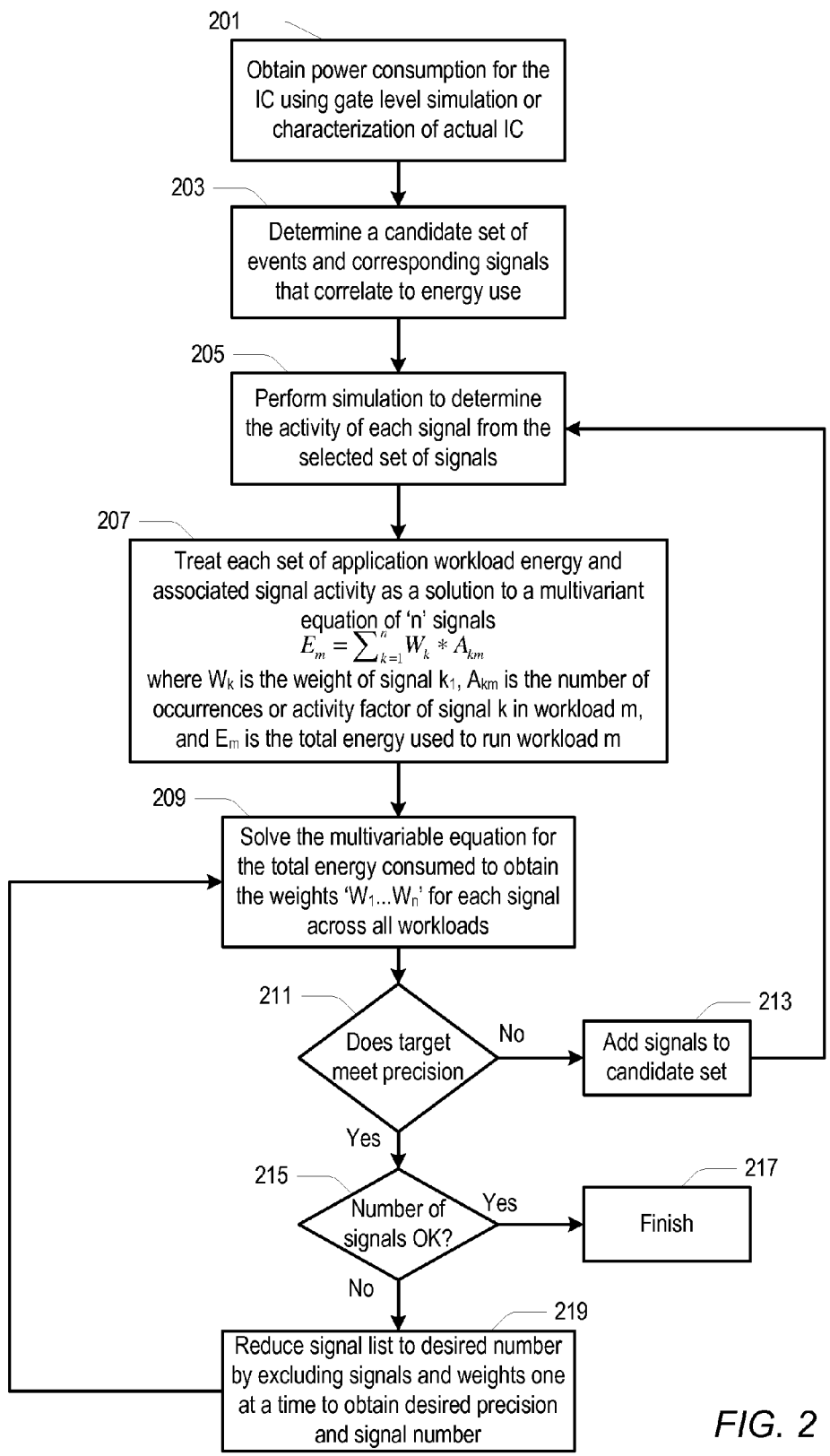
FIG. 2 is a flow diagram depicting one embodiment of a method for determining the weight factors to apply to each signal during power monitoring and estimation.

FIG. 2 is a flow diagram describing a method for determining the weight factors to apply to each signal during power monitoring and estimation. Referring collectively to FIG. 1 and FIG. 2, and beginning in block 201 of FIG. 2, an energy value that corresponds to the power consumed by the IC under a predetermined set of conditions is obtained. For example, a set of instructions may be executed that may be designed to exercise either specific portions or as much of the IC as possible, as desired, thereby causing the IC to consume a great deal of power. This set of instructions is commonly referred to as a "power virus" program. In one embodiment, a physical IC device may execute the instructions and the total power consumed may be measured directly on a test bench or other platform designed for that purpose. In another embodiment, a synthesis tool may run a gate level simulation the RTL design of the IC while the IC design executes the set of instructions. In one particular implementation the RTL design may include a resistance and capacitance annotated netlist of the IC. The synthesis tool may then estimate the power consumed by the IC device. In either case, the energy value that corresponds to the power consumed by the IC is used as a reference energy value or "gold standard."

In another embodiment, it may be possible to measure the power consumed by individual portions of the IC. It is noted that the using superposition, the total power consumed would be equal to the sum of the power consumed by all the individual portions of the IC.

Once the reference energy value has been obtained, a candidate set (or subset) of microarchitectural events and their corresponding signals may be chosen from all of the signals in the IC or portion of interest of the IC (block 203). In one embodiment, the set of signals may be selected such that an activity level on a given signal is correlates to a particular energy use. For example, enable signals for major memory arrays, or clock gating signals to flip-flops may be used. Alternatively, signals from a much higher level in the design may be chosen. More particularly, microarchitectural performance monitor signals that may be used to characterize application performance and activity on high level microarchitectural blocks may be used, for example.

Once the signals have been chosen, an RTL gate level simulation may be performed on the IC design and the activity factor of each of the chosen signals may be determined (block 205). The weight factor that will be applied to each signal during actual power estimation on the IC may now be determined. More particularly, to calculate the weight factor for each signal, a multivariable equation of 'n' signals (shown in equation 1) is set up and solved using any of a variety of techniques (block 207). The equation represents performing a weighted sum of events (activity factors)×weight factors. As such Equation 1 is as follows:

$$E_m \Sigma_{k=1}^{n} W_k * A_{mk} \qquad (1)$$

where $E_m$ is the total energy value used to run a workload m and that was determined in block 201. The $W_k$ is the weight factor of signal k, and $A_{km}$ represents the activity factor for each signal k in workload m. Thus, each signal will be assigned a corresponding weight factor, and the sum of the sets should equal $E_m$.

It is noted that depending on the number of signals and other factors, it may be difficult if not impossible to exactly solve the equation. However, using various optimization methods, the equation may be solved such that a sufficient approximation may reached which provides weight factors that yield an $E_m$ that is close enough to within some predetermined accuracy or percentage of the reference energy value (block 209).

When solving for the weight factors, as the number of signals increases, the problem complexity may become unwieldy. Accordingly, it may be possible to reduce the complexity by constraining the system in some way. For example, there may be many replicated structures such as functional units in the design. When these are identified, equation 1 may be modified such that $W_k * A_{km}$ becomes $W_k(A_{k1m} + A_{k2m} + \ldots A_{kxm})$, where each replicated structure $k_1 \ldots k_2 \ldots k_x$ now shares the same weight factor $W_k$, which may reduce the number of weights for which to solve.

As mentioned above, linear superposition may be used to add up the energy values of individual portions of the IC to obtain a total energy. Accordingly, in one embodiment, this principle may be used when calculating the weight factors. For example, instead of calculating the weight factors for the whole IC, the weight factors may be calculated for individual blocks, as long as a reference energy value was obtained for those individual blocks.

If the accuracy is not good enough (i.e., it is not within a predetermined accuracy) (block 211), additional signals may be added to the candidate set of signals (block 213), and the operation proceeds as described above in block 205 through 211, where an RTL simulation is performed to determine the activity factors for the added signals, and the weight factors are found through solving Equation 1.

Referring back to block 211, if the accuracy of the weight factors is close enough, the number of signals may be checked (block 215). More particularly, it is possible that during one or more early passes through the process, the accuracy was well within the predetermined accuracy threshold, but the number of signals may be too high. In such cases, it may be possible to reduce the number of signals while still maintaining an acceptable accuracy. Accordingly, if the number of signals is too high, the number of signals may be reduced one signal at a time (block 219). In various embodiments, it may be possible to use any of a variety of computer aided design optimization methods. For example, there are genetic algorithms, simulated annealing algorithms, and signal group removal, and the like. The particular method of signal removal is not germane to this disclosure. The process then proceeds as described above in block 209, in which Equation 1 is solved again for the new number of signals. Referring back to block 215, if the number of signals is within a predetermined number, then the signal selection process is complete.

Once the process is completed, the signal list and corresponding weights may be used in the physical IC. More particularly, in one embodiment, as mentioned above, the signal names and thus the corresponding signal paths may be hardwired into the IC design and manufactured so that the power monitor 17 may always monitor those signals. In another embodiment, the signals may be programmed into reg. 19 and used by firmware within the power monitor 17. The weight factors may be programmed into the reg 19 of each power monitor 17.

As mentioned above, rather than solve equation 1 to determine each weight factor, it is possible to experimentally determine the weight factors on the physical IC device. Turning to FIG. 3, a flow diagram describing another method for determining the weight factors to apply to each signal during power monitoring and estimation is shown. Beginning in block 301, once the signals to be monitored are hardwired or programmed into the power monitor 17, the weight factor values may be programmed into the reg 19 of the power monitor 17. It is noted that the signals to be monitored may be determined as described above in conjunction with the description of FIG. 2, for example. The set of instructions that exercise the IC may be executed by the IC, and the power monitor 17 may estimate an energy value that corresponds to the power consumed. In one embodiment, an application program may be executed to extract the energy information from the node controller 20.

The estimated energy value may be compared with the reference energy value that was determined as described above. If the estimated energy value is not within a predetermined accuracy percentage, or otherwise is not accurate enough (block 303), operation proceeds as described in block 301, in which new weight factor values may be programmed into the power monitor 17. This process may be iterated as many times as necessary to obtain weight factor values that yield an estimated energy value that has the requisite precision when compared to the reference energy value. Once the estimated energy value meets the required precision, the process is complete (block 305). Those weight values may then be used during operation of the IC for digital power monitoring.

As mentioned above, an exemplary system is shown on which the determining of the weight factors may be performed using either simulations of the IC design or the physical IC device itself. Referring to FIG. 4, a block diagram of one embodiment of a system for use in determining the weight factors is shown. The system 400 includes a processing unit 401 that is coupled to a storage 407. The processing unit 401 is also coupled to an IC device 421. As shown, the storage 407 may include data files such as IC device net list 411 and signal and weight list 415, and application and test programs 413.

In one embodiment, system 400 may be a test platform used to design and/or test IC devices such as IC device 421. More particularly, processing unit 401 may include one or more processors that may be configured to execute application and test programs 413. Processing unit 401 may also include various peripheral and I/O support hardware (not shown) for communication with IC device 421. In addition, processing unit 401 may include memory controller hardware for controlling accesses to storage 407, as well as any internal system memory that may be part of processing unit 401.

As described above, an IC design tool such as a synthesis tool may be used to run simulations. Accordingly, IC device net list 411 may be representative of an RTL net list of an IC device such as the IC device 421. In addition, application and test programs 413 may include IC design software including synthesis and layout tools, as well as test programs that exercise the IC device 421 during power monitoring etc. In addition, application and test programs 413 may also include specific test programs to access and exercise the IC device 421, and to provide results back to processing unit 401. In one embodiment, the signal and weight list 415 may be a listing of the signals that will be monitored by power monitors 17 along with the corresponding weight factors.

The storage 407 may be representative of any type of computer readable memory medium. For example in various embodiments, storage 407 may include any memory medium on which computer programs according to various embodiments may be stored. The term "memory medium" may include an installation medium, e.g., a CD-ROM, or floppy disks 160, a computer system memory such as DRAM, SRAM, EDO DRAM, SDRAM, DDR SDRAM, Rambus RAM, etc., or a non-volatile memory such as a magnetic media, e.g., a hard drive, or optical storage.

In various embodiments, the methods described above may be performed either wholly or in part on the system 400, as desired. More particularly, the method described in FIG. 2 may be performed using system 400. For example, the processing unit 401 may be used to execute application and test programs such as a synthesis engine to perform the gate level simulation of the IC design included in the IC device netlist 411. The simulation may include the IC design executing another application and test program to exercise the simulation of the IC design so that signal activity may be recorded. Furthermore, an additional application and test program may be executed by processing unit 401 to calculate the weight factors.

In addition, the system 400 may be used as an IC test platform to test the physical IC device 421, as described above in conjunction with the description of FIG. 3. In such an embodiment, the processing unit 401 may execute a test program that may access IC device 421 to iteratively program weight factors into the power monitors 17 and to load the set of instructions that exercise the IC device 421.

In one embodiment, a specialized application and test program may cause the entire process shown in FIG. 2 to execute automatically. More particularly, a test program may automatically load the net list 411, cause the synthesis tool to run the simulation of the netlist 411, while a test program is executed by the simulated IC. The specialized test program may extract timing and activity information from the synthesis tool output to automatically select the candidate signals. In addition, the test program may then set up and solve equation 1 above for the weight factors, and then if necessary, iteratively add and or remove signals and recheck the accuracy. The test program may also output the signal and weight list 415 at the completion of the process.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
measuring a power consumed by at least a portion of an integrated circuit device during operation to obtain a corresponding energy value;
performing, by a processor:
selecting a subset of signals from a set of all signals within the integrated circuit device that correlates to energy use within the integrated circuit device;
determining an activity factor of each signal in the selected subset of signals by monitoring each signal in the selected subset of signals while simulating execution of a particular set of instructions; and
determining at least an approximation of a weight factor for each signal in the selected subset of signals based on the energy value, the activity factors and respective weight factors.

2. The method as recited in claim 1, further comprising estimating the power consumed by the at least a portion of an integrated circuit device by running a gate level simulation of a register transfer level (RTL) design of the integrated circuit device executing the particular set of instructions.

3. The method as recited in claim 2, wherein the RTL design includes a netlist that is annotated with resistance and capacitance values.

4. The method as recited in claim 1, further comprising measuring the power consumed by the at least a portion of an integrated circuit device by causing the integrated circuit device to execute the particular set of instructions and directly measuring the power consumed.

5. The method as recited in claim 1, wherein the activity factor for a given signal corresponds to a number of times the given signal transitions from one logic value to another logic value during a particular period of the simulation.

6. The method as recited in claim 1, further comprising generating a list of the selected subset of signals and their respective corresponding weight factors.

7. The method as recited in claim 1, further comprising programming the weight factors into a power monitor unit of the integrated circuit device and generating an estimated energy value of respective portions of the integrated circuit device during operation.

8. The method as recited in claim 1, further comprising determining the weight factor for each signal by solving within a predetermined percentage, a multivariable equation in which the energy value equals a weighted sum of the activity factor of the signals of the selected subset of signals multiplied by their respective weight factor.

9. A method comprising:
obtaining an energy value by measuring a power consumed by at least a portion of an integrated circuit device during operation;
performing, by a processor:
selecting a subset of signals from a set of all signals that correlate to energy use within the integrated circuit device;
determining an activity factor of each signal in the selected subset of signals by monitoring each signal in the selected subset of signals while simulating execution of a particular set of instructions; and
determining a final weight factor for each signal in the selected subset of signals by iteratively programming the integrated circuit device with a new weight factor value for at least some of the signals in the selected subset of signals and re-executing the particular set of instructions using the new weight factor values until an estimated energy value is within a predetermined percentage of the energy value.

10. The method as recited in claim 9, wherein the activity factor for a given signal corresponds to a number of times the given signal transitions from one logic value another logic value during the simulation.

11. The method as recited in claim 9, further comprising generating a list of the selected subset of signals and their respective corresponding weight factors.

12. The method as recited in claim 9, further comprising programming the final weight factors into a power monitor unit of the integrated circuit and generating an estimated energy value of respective portions of the integrated circuit device during operation.

13. A computer readable storage medium including program instructions executable by a processor to:
  measure a power consumed by at least a portion of an integrated circuit device during operation to obtain a corresponding energy value;
  select a subset of signals from a set of all signals within the integrated circuit device that correlate to energy use within the integrated circuit device;
  determine an activity factor of each signal in the selected subset of signals by monitoring each signal in the selected subset of signals while simulating execution of a particular set of instructions; and
  determine at least an approximation of a weight factor for each signal in the selected subset of signals based on the energy value, the activity factors, and the respective weight factors.

14. The computer readable storage medium as recited in claim 13, wherein the program instructions comprise a test program configured to automatically generate a list including the selected subset of signals and a corresponding respective weight factor for each signal in the subset of signals.

15. The computer readable storage medium as recited in claim 14, wherein the test program is further configured to launch a synthesis tool to perform the simulation of a register transfer level (RTL) netlist of at least a portion of the integrated circuit device while the integrated circuit device is executing the particular set of instructions.

16. The computer readable storage medium as recited in claim 15, wherein the test program is further configured to solve within a predetermined percentage, a multivariable equation in which the energy value equals a weighted sum of the activity factor of the signals of the selected subset of signals multiplied by their respective weight factor.

17. The computer readable storage medium as recited in claim 16, wherein the test program is further configured to iteratively add one or more signals to the subset of signals, determine the activity factor of each added signal in the selected subset, and to solve the multivariable equation until a solution to the multivariable equation is within the predetermined percentage.

18. The computer readable storage medium as recited in claim 16, wherein the test program is further configured to iteratively remove one or more signals and solve the multivariable equation until a number of signals from the selected subset of signals is less than a predetermined number.

19. A system comprising:
  a processing unit configured to execute program instructions;
  a storage coupled to the processing unit and configured to store the program instructions;
  wherein, when executed, the program instructions are configured to:
    measure a power consumed by at least a portion of an integrated circuit device during operation to obtain a corresponding energy value;
    select a subset of signals from a set of all signals within the integrated circuit device that correlate to energy use within the integrated circuit device;
    determine an activity factor of each signal in the selected subset of signals by monitoring each signal in the selected subset of signals while simulating execution of a particular set of instructions; and
    determine at least an approximation of a weight factor for each signal in the selected subset of signals based on the energy value, the activity factors, and the respective weight factors.

20. The system as recited in claim 19, wherein the program instructions comprise a test program configured to automatically generate a list including the selected subset of signals and a corresponding respective weight factor for each signal in the selected subset of signals.

21. The system as recited in claim 20, wherein the test program is further configured to solve within a predetermined percentage, a multivariable equation in which the energy value equals a weighted sum of the activity factor of the signals of the selected subset of signals multiplied by their respective weight factor.

22. The system as recited in claim 21, wherein the test program is further configured to iteratively add one or more signals to the selected subset of signals, determine the activity factor of each added signal in the selected subset, and to solve the multivariable equation until a solution to the multivariable equation is within the predetermined percentage.

* * * * *